A. M. GOW.
DUMP CAR.
APPLICATION FILED SEPT. 12, 1918. RENEWED FEB. 3, 1920.

1,338,010.

Patented Apr. 27, 1920.

Witnesses:

Inventor:
Alexander M. Gow,
By D. Anthony Usina
Atty.

UNITED STATES PATENT OFFICE.

ALEXANDER M. GOW, OF DULUTH, MINNESOTA.

DUMP-CAR.

1,338,010.  Specification of Letters Patent.  Patented Apr. 27, 1920.

Application filed September 12, 1918, Serial No. 253,774. Renewed February 3, 1920. Serial No. 355,957.

*To all whom it may concern:*

Be it known that I, ALEXANDER M. GOW, a citizen of the United States, residing at Duluth, in the county of St. Louis and State of Minnesota, have invented certain new and useful Improvements in Dump-Cars, of which the following is a specification.

This invention relates to dump cars.

One of the objects of the invention is to simplify the construction and operation of dump cars, especially that type of car which is dumped bodily to one side or the other.

Another object is to reduce the number of parts to a minimum and arrange said parts to coöperate in a more efficient manner.

Another object is to provide a dump car adapted to meet the various requirements for successful commercial operation.

These and other objects are accomplished by the mechanism disclosed by the accompanying sheets of drawings, in which—

Figure 1:
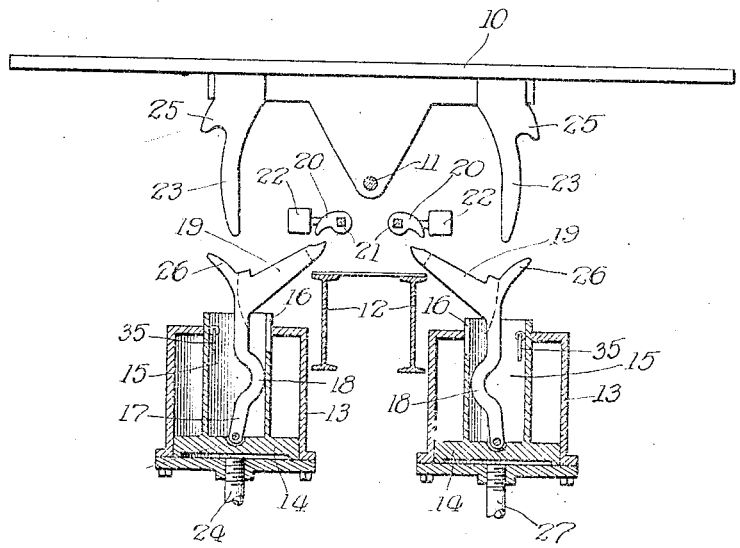
Figure 1 is a fragmentary cross sectional view of a dump car embodying my invention, the parts being in their normal positions.

The various novel features of my invention will be apparent from the following description and drawings and will be particularly pointed out in the appended claims.

Referring to the figures of the drawings, it will be noted that I have shown a car body 10, which is pivotally mounted upon a center 11 for oscillation to either side for dumping purposes, it being understood that the car body is supported by a car frame including center sills 12, which are mounted upon suitable car trucks. Mounted upon the car frame are vertically arranged fluid pressure cylinders 13 located on opposite sides of the center of the car, said cylinders having reciprocating pistons 14 mounted therein provided with integrally formed hollow cylindrical portions 15, each having a slot 16 in the wall thereof for a purpose to be described later. Pivotally connected to each piston structure within the cylindrical portion 15 is a piston rod 17 having formed intermediate its ends an offset portion 18, which normally engages the inside of the cylindrical portion 15 nearest the center of the car, the piston rod normally being maintained in this position as a result of the offset portion 18, and as a result of the weight of a laterally projecting arm or member 19 formed integrally with the piston rod at the upper end of the latter.

The primary function of the member 19 is to move the locking mechanism into a position such that the car body may be dumped to one side or the other, said unlocking action always taking effect before a dumping action is transmitted. The upper and inner extremity of the member 19, as shown in Fig. 1, when the piston is moving upwardly upon a dumping movement, passes into engagement with the dog 20 secured to the lock releasing shaft 21, to which is secured a weight 22 normally for holding the dog 20 in the position shown in Fig. 1, and to return said dog to said position when moved therefrom. As shown in Figs. 1 to 5, inclusive, the car body 10 is provided with downwardly extending horn members 23 which lie within the path of movement of the piston rod 17.

Figure 2:
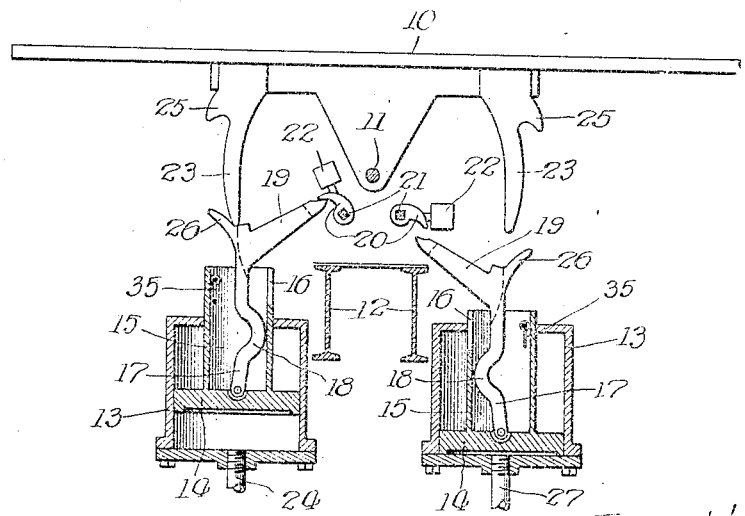
Fig. 2 is a similar sectional view showing the piston rod moved upwardly to a point where it has unlocked the locking mechanism and passed into engagement with a depending horn member preparatory to dumping the car to the right.

With the parts in the position shown in Fig. 1 of the drawings, let it be assumed that air is supplied to the left-hand cylinder 13 through the connection 24. Under such conditions the piston 14 will rise, the upper and inner part of the arm 19 passing into engagement with the dog 20 for rotating the lock releasing shaft 21, whereby the car body is made free for a dumping action to the right-hand side, it being understood that any suitable locking mechanism may be operatively associated with the unlocking shaft 21, such, for instance, as the locking mechanism shown in my copending application, Serial No. 240,116, filed June 15, 1918, now Patent No. 1,290,735, dated January 7, 1919. As soon as the arm 19 has moved the unlocking shaft into a lock releasing position, as shown in Fig. 2 of the drawings, the upper end of the piston rod 17 passes into engagement with the lower end of the horn 23. Upon a continued upward movement of the left-hand piston rod 17, the left-hand side of the car will be raised to oscillate the car body upon its center 11, and the member 19 will pass out of engagement with the dog 20, the latter of which will be returned to its normal position by the weight 22, it being understood that the car body by this time is beyond a position where it can be locked against dumping movement to the right. By the time that the piston rod 14 has reached the upper end of the cylinder 13, the piston rod will have been raised to such a position wherein the car body will have passed beyond a critical position and will have dumped to the right, due to the weight of the car body and the load therein, as shown in Fig. 3 of the drawings.

Figure 3:
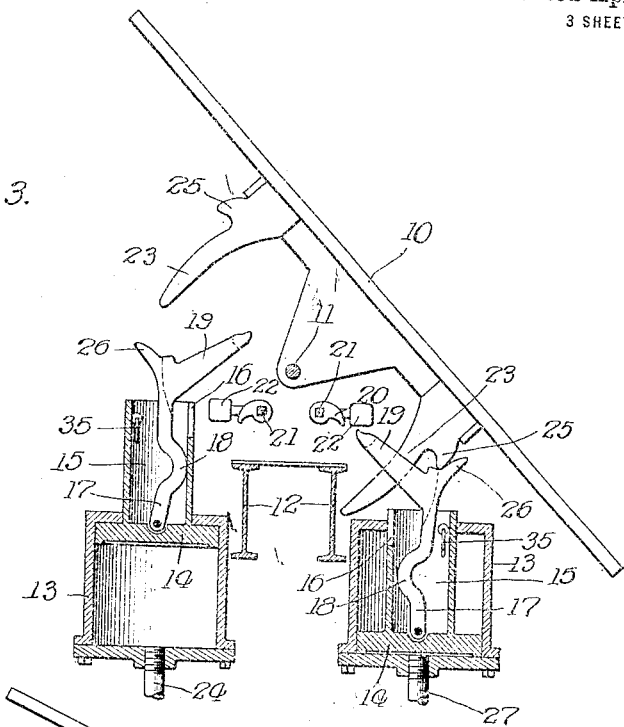
Fig. 3 is a similar view showing the car body dumped to the right.

It will be noted by reference to Fig. 3 that the auxiliary projection 25 on the right-hand horn member 23 has passed into engagement with the outer top cam portion 26 of the right-hand piston rod 17 with the piston in its lowermost position. Due to the auxiliary projection 25 passing into engagement with the cam portion 26, the right-hand piston rod has been moved slightly to the right, so that the arm 19 on the right-hand piston rod, during an upward movement for righting the car body, will not pass into engagement with the dog 20 on the right-hand unlocking shaft 21, thereby preventing a dumping action of the body to the left if for any reason the body should become overbalanced in that direction.

With the parts as shown in Fig. 3, and assuming that it is desired to right the car body, air under the left-hand piston is permitted to escape and air is supplied under the right-hand piston through the pipe 27, whereupon the right-hand piston moves upwardly, causing the car body to swing toward a horizontal position.

Figure 4:
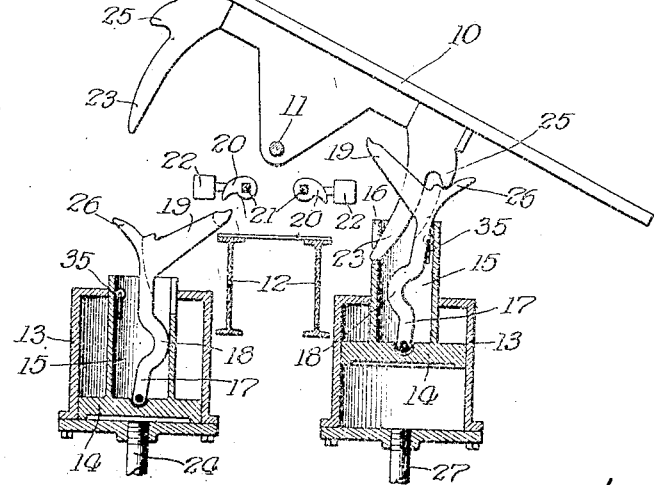
Fig. 4 is a similar sectional view showing the car body being righted.
Figure 7:

By referring to Fig. 4 of the drawings, it will be noted that the lower end of the right-hand horn member 23 passes through the slot 16 in the right-hand cylindrical piston member 15 to make possible the righting action of the car body with the horn 23 arranged as shown. When the right-hand piston has reached its upper limit of movement, the car body 10 will have reached its central position, due partially to its own momentum. It will be noted that during this upward righting movement of the right-hand piston, the right-hand piston rod is moved outwardly farther from its normal position, but also it will be noted that as soon as the right-hand piston moves downwardly toward its normal position, as shown in Fig. 1, it will slide over the right-hand dog 20 and back into a position wherein the offset portion 18 will engage the inner wall of the cylindrical piston portion 15. Attention is called to the fact that the member 19 includes two spaced side portions, as shown in Fig. 7 of the drawings, said spaced portions being connected at the upper inner ends for engagement with the dog 20. By referring to Figs. 3 and 4 of the drawings, it will be noted that the horn member 23 passes down between the spaced portions of the member 19. In view of the fact that the member 19 does not pass into engagement with its corresponding dog 20 during the righting movement, the locking mechanism is maintained in its locking position to prevent a dumping action to the other side of the car, thereby avoiding accidents which might result seriously. It will be understood that the car may be dumped to the left in a manner similar to the dumping action to the right.

In Figs. 1 to 5, inclusive, I have shown the horns 23 as rigidly connected to the car body. In Fig. 6 I have shown a modification in which the horns 30 are not rigidly connected with the car body, but, on the other hand, are formed integrally with each other by connecting arms 31, the central connecting point of which is pivotally connected to the car frame at 32. The upper part of the horns are arranged with an enlarged bearing surface 32′ for engagement with the car body, and if desired for any reason, such, for example, as overcoming any inaccuracies in manufacture, shims may be interposed between the bearing surface 32′ and the car body to properly center the latter. By means of this latter arrangement it is possible to erect all of the operating parts on the car frame and test same out prior to the time that the car body is mounted on the frame.

By means of the arrangement which I have shown herein, it is possible to move the piston rods laterally within the piston portions 15 into an inoperative position, in so far as unlocking the car and dumping the same is concerned. This is accomplished by moving the piston rods laterally to their outermost positions and hooking the same in such positions by hooks 35, whereupon any upward movement of the piston rods would be ineffective so far as unlocking or dumping the car is concerned.

Figure 5:
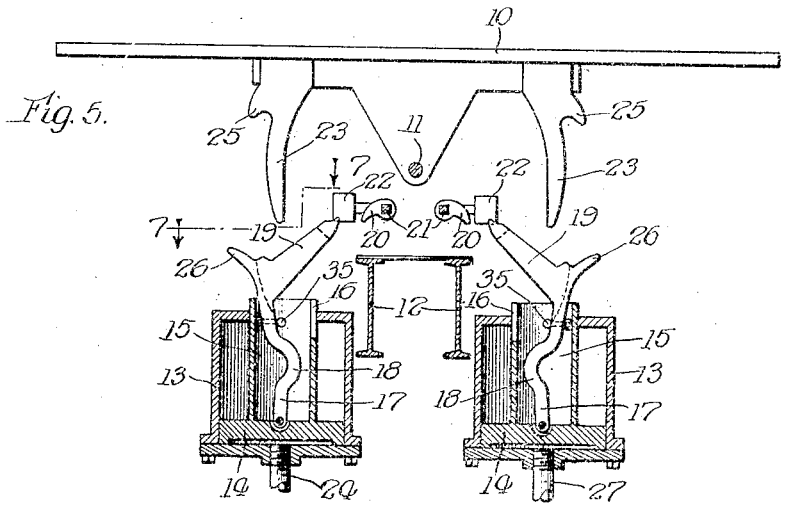
Fig. 5 is a fragmentary cross sectional view of the dump car with the piston rod moved into an inoperative position.
Figure 6:
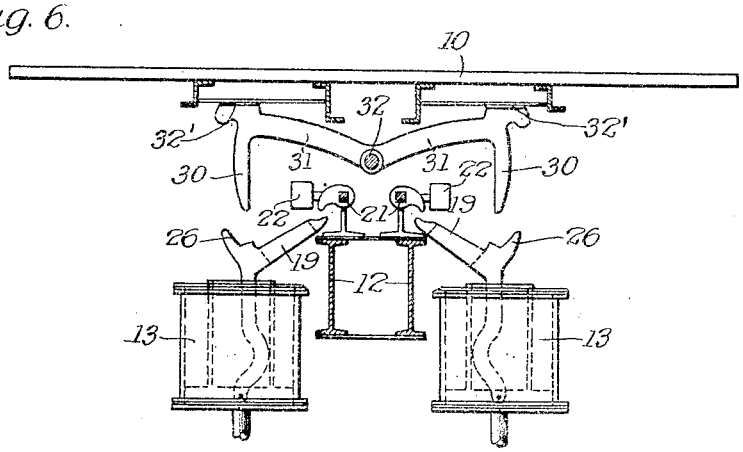
Fig. 6 is a fragmentary cross sectional view of a dump car showing a modification of my invention; and, Fig. 7 is a detail view taken in the plane of line 7—7 of Fig. 5.

By referring to Fig. 5, wherein the pistons are locked in such positions, it will be noted that arms 19 will not pass into engagement with the dogs 20, and that the horns 23, instead of being engaged by the inner ends of the member 19, will pass down between the spaced portions thereof. This makes possible the testing of the cylinders without actual operation of the car. It also makes possible a safeguard against any unlocking and dumping of the car during transit.

It is my intention to cover all modifications of the invention falling within the spirit and scope of the following claims.

I claim:

1. In a dump car, a car body mounted for oscillation, a member operatively connected to said body, locking mechanism for the car body, and an oscillating piston rod the upper end of which is free for affecting the locking mechanism and engaging said member to oscillate the car body.

2. In a dump car, a body mounted for oscillation, a member operatively connected to said body, locking mechanism for said car body, and a vertically and transversely movable piston rod the upper end of which is free for affecting the locking mechanism and engaging said member to oscillate the car body.

3. In a dump car, a car body mounted for oscillation, a depending member operatively connected to said body, locking mechanism for the car body, and a fluid-operated oscillating piston rod for actuating the locking mechanism and for engaging said member to oscillate the car body, a lateral movement of said piston rod being gravity controlled.

4. In a dump car, a body mounted for oscillation, locking mechanism therefor, a piston, and a piston rod having a transverse movement and also movable in a vertical direction, said piston rod having an integral extension for engaging and operating the locking mechanism.

5. In a dump car, a car body mounted for oscillation, a member operatively connected thereto, a piston rod actuated in a vertical direction for successively engaging the locking mechanism and for engaging said member for oscillating the car body, said piston rod also being capable of transverse movement for avoiding an operative action and normally occupying a certain predetermined position.

6. In a dump car, a car body mounted for oscillation, a member movable with the car body, and a vertically actuated piston rod capable of lateral movement having its upper end free and movable into engagement with the lower end of said member to dump the car body.

7. In a dump car, a car body mounted for oscillation, locking mechanism on each side of the car, and a piston rod on each side of the car for dumping and righting the car body, the piston rod on each side of the car being controlled to avoid operative engagement with the locking mechanism when righting the car body.

8. In a dump car, a car body mounted for oscillation, a member operatively connected with said car body and having a plurality of projections, dumping mechanism for the car body including a piston rod movable vertically and transversely and being arranged to successively engage the locking mechanism for unlocking the car body and engaging one of the projections of said member for dumping the car body, another projection of said member engaging said piston rod when the car body is in a dumped position to throw the piston rod into a position wherein it will avoid operative engagement with the locking mechanism during a righting movement of the car body.

9. In a dump car, a car body mounted for oscillation, a member operatively connected thereto and having a plurality of projections, and a piston rod for engaging one of the projections for dumping the car, the other projection engaging the piston rod for throwing the same laterally to avoid an unlocking action of the car body.

10. In a dump car, a car body, a depending member operatively connected thereto, a dumping cylinder, a piston mounted therein having a hollow portion with a slot therein, an oscillating piston rod for engaging said depending member for dumping the car, said member passing through the slot in said piston during a righting movement of the car body.

11. In a dump car, a dumping cylinder, a piston movable therein and having a hollow portion, a piston rod having a lateral movement within said hollow portion, and a horn operatively associated with the car body for moving the piston rod laterally under certain predetermined conditions.

Signed at Duluth, Minn., this 4th day of September, 1918.

ALEXANDER M. GOW.

Witnesses:
JOHN E. CARLSON,
E. H. WINSLOW.